US008844478B2

United States Patent
Roth

(10) Patent No.: US 8,844,478 B2
(45) Date of Patent: Sep. 30, 2014

(54) MODULAR UNIT COMPOSED OF A CYLINDER SLEEVE AND CRANKCASE

(75) Inventor: Ingo Roth, Oehringen (DE)

(73) Assignee: MAHLE International GmbH, Stuttgart (DE)

( * ) Notice: Subject to any disclaimer, the term of this patent is extended or adjusted under 35 U.S.C. 154(b) by 286 days.

(21) Appl. No.: 12/928,726

(22) Filed: Dec. 17, 2010

(65) Prior Publication Data

US 2011/0168109 A1    Jul. 14, 2011

(30) Foreign Application Priority Data

Dec. 18, 2009 (DE) .......................... 10 2009 059 057

(51) Int. Cl.
- *F02F 1/10* (2006.01)
- *F16J 10/04* (2006.01)
- *F02F 1/16* (2006.01)

(52) U.S. Cl.
CPC ... *F16J 10/04* (2013.01); *F02F 1/16* (2013.01)
USPC .................. 123/41.84; 123/41.81; 123/41.72

(58) Field of Classification Search
CPC .............. F02F 1/065; F02F 1/10; F02F 1/14; F01P 1/02; F01P 3/02; F01P 2003/021; F01P 7/16; F01P 11/04; F01P 2031/22; F02B 2075/025

USPC .................... 123/41.72, 41.83, 41.84
See application file for complete search history.

(56) References Cited

U.S. PATENT DOCUMENTS

| | | | | |
|---|---|---|---|---|
| 3,389,693 A | * | 6/1968 | Herschmann et al. ...... | 123/41.84 |
| 4,548,165 A | * | 10/1985 | Vorobiev et al. ........... | 123/41.84 |
| 4,656,982 A | * | 4/1987 | Mirjanic .................... | 123/193.3 |
| 5,402,754 A | | 4/1995 | Gunnarsson | |
| 6,035,822 A | * | 3/2000 | Suzuki et al. ................. | 123/276 |
| 6,145,481 A | * | 11/2000 | Bock et al. ................. | 123/41.79 |
| 7,255,069 B2 | * | 8/2007 | Liebert ....................... | 123/41.79 |
| 7,438,037 B2 | * | 10/2008 | Oogake et al. ............. | 123/193.2 |
| 2005/0279296 A1 | * | 12/2005 | Coney et al. ............... | 123/41.84 |

FOREIGN PATENT DOCUMENTS

| | | |
|---|---|---|
| DE | 43 43 238 | 7/1994 |
| DE | 101 53 178 | 5/2003 |

* cited by examiner

*Primary Examiner* — Lindsay Low
*Assistant Examiner* — Syed O Hasan
(74) *Attorney, Agent, or Firm* — Collard & Roe, P.C.

(57) ABSTRACT

A modular unit is composed of a cylinder sleeve and a crankcase for an internal combustion engine. The cylinder sleeve and the crankcase each have a face surface and a cooling water space that at least partly surrounds the cylinder sleeve and is open toward the face surfaces is configured between the cylinder sleeve and the crankcase. A holder ring is provided, which completely covers the cooling water space and at least partially covers the face surface of the cylinder sleeve.

9 Claims, 3 Drawing Sheets

MODULAR UNIT COMPOSED OF A CYLINDER SLEEVE AND CRANKCASE

CROSS REFERENCE TO RELATED APPLICATIONS

Applicant claims priority under 35 U.S.C. 119 of German Application No. 10 2009 059 057.9 filed Dec. 18, 2009.

BACKGROUND OF THE INVENTION

1. Field of the Invention

The present invention relates to a modular unit composed of a cylinder sleeve and a crankcase, for an internal combustion engine. The cylinder sleeve and the crankcase each have a face surface, and a cooling water space that at least partly surrounds the cylinder sleeve and is open toward the face surfaces is configured between the cylinder sleeve and the crankcase.

2. The Prior Art

A modular unit of this type is described, for example, in German Patent Application No. DE 101 53 178 A1. The cylinder sleeve has a circumferential flange that is accommodated in a contact shoulder, which is configured in the crankcase in the region of its face surface. The circumferential flange takes on radial guidance of the cylinder sleeve and absorbs the axial stress that acts on the cylinder sleeve after installation of the cylinder head or the cylinder head gasket onto the cylinder sleeve. For this reason, the circumferential flange is particularly susceptible to wear. However, a repair is difficult to impossible, because the cylinder sleeve has to be replaced, and this sleeve is generally pressed or cast into the crankcase.

SUMMARY OF THE INVENTION

It is therefore an object of the invention to provide a modular unit composed of a cylinder sleeve and crankcase, in such a manner that both production and repair, while maintaining operational reliability, are simplified.

This object is accomplished according to the invention by a cylinder sleeve and crankcase having a holder ring which covers the cooling water space completely and the face surface of the cylinder sleeve at least in part.

The holder ring is configured as a separate component, separate from the cylinder sleeve. After installation of the cylinder head or the cylinder head gasket, the holder ring takes over both radial guidance of the cylinder sleeve in the crankcase and sealing of the cooling water space. The holder ring furthermore absorbs the axial stress that acts on the cylinder sleeve, proceeding from the cylinder head or from the cylinder head gasket, after its installation, at least in part.

Since the radial guidance of the cylinder sleeve takes place by way of the holder ring provided according to the invention, the cylinder sleeve can be produced with a thinner wall than in the state of the art. Furthermore, a greater selection of materials for production of the cylinder sleeve can be used, so that the mechanical and/or tribological properties of the cylinder sleeve can be optimized with a targeted material selection.

Since the holder ring provided according to the invention is structured as a component separate from the cylinder sleeve, it can be produced from a different material than the cylinder sleeve. In this way, the wear resistance, the rigidity, and the heat conductivity of the holder ring in particular can be optimized by means of a targeted material selection. Furthermore, the thermal expansion of the different materials used for the cylinder sleeve and the holder ring can be optimally coordinated to one another and to the material of the crankcase. Particularly if the crankcase is produced from an aluminum alloy that has a greater heat expansion coefficient than the materials used for the cylinder sleeve and/or the holder ring, the holder ring can be installed with a play fit or shift fit, for example.

The holder ring provided according to the invention can be easily removed and separately replaced in case of wear. This furthermore makes it possible to also fix the cylinder sleeve in place in the crankcase in a replaceable manner, for example using a low-stop version (mounting of the cylinder sleeve at its foot end) or a mid-stop version (central mounting of the cylinder sleeve, see German Patent Application No. DE 43 43 238 A1). In the removal of the cylinder sleeve, the latter can be grasped on its outside surface, in the region of the cooling water space, thereby further simplifying its removal.

The modular unit according to the invention has a simple structure, overall, and is easy to handle, and this also results in a significant cost advantage.

It is practical if a face surface of the holder ring is disposed flush with the face surface of the crankcase, so that the cylinder head gasket can extend over the entire holder ring.

In a preferred embodiment, the holder ring partially covers the cylinder sleeve. In this case, the cylinder sleeve has a mortise in the region of its face surface, in which the holder ring is accommodated. In the case of this embodiment, the cylinder sleeve is supported and held particularly securely in the radial direction.

In the case of this embodiment, as well, it is practical if a face surface of the holder ring is disposed flush relative to the face surface of the cylinder sleeve and relative to the face surface of the crankcase, so that the cylinder head gasket can extend over the entire holder ring.

In another preferred embodiment, the holder ring partially covers the face surface of the crankcase. It is advantageous if the crankcase has a mortise in the region of its face surface, in which the holder ring is accommodated, in order to obtain particularly reliable radial support in this embodiment.

In another preferred embodiment, the holder ring covers the face surface of the cylinder sleeve completely, so that the axial stress that acts on the cylinder sleeve and proceeds from the cylinder head or the cylinder head gasket after its installation is completely absorbed by the holder ring.

In the case of this embodiment, it is possible to form a stripper ring, which projects into the interior of the cylinder sleeve, onto the holder ring. This stripper ring serves to strip off carbon deposits, which might form during engine operation, from the piston accommodated in the cylinder sleeve, particularly from the top land of the piston. The stripper ring can be used without making any structural changes in the cylinder sleeve, so that this embodiment of the modular unit according to the invention is particularly easy to install.

The face surface of the crankcase can have a lift-out depression and/or a lift-out groove assigned to the holder ring, in order to further simplify removal of the holder ring.

The holder ring preferably consists of a metallic material, for example a cast-iron alloy, a steel material, or a non-ferrous alloy. In this way, the wear resistance, the rigidity, the heat conductivity, and the heat expansion of the holder ring, in particular, can be adjusted in a targeted manner, independent of the cylinder sleeve, and its mechanical and thermal properties can be optimized, in order to achieve the longest possible useful lifetime. If the holder ring is configured to have a coating, its heat conductivity can be influenced even more. Since the holder ring is configured as a separate component, such a coating can be applied in simple and cost-advantageous manner.

It is particularly preferable if the cylinder sleeve consists of a steel material. In this way, it can be produced with a thinner wall than in the state of the art, without its mechanical properties, particularly its strength, being impaired. Furthermore, a weight saving can be achieved, if necessary. Another advantage consists in that the cooling water space can be enlarged, while maintaining the same construction space, and thus the susceptibility to cavitation can be reduced, and/or that the cylinder bore for accommodating the cylinder sleeve in the crankcase can be enlarged without reducing the size of the cooling water space.

In a particularly simple manner, the cylinder sleeve can be drawn from a pipe, preferably in a seamless manner, so that it can be produced in a particularly economical and efficient manner.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
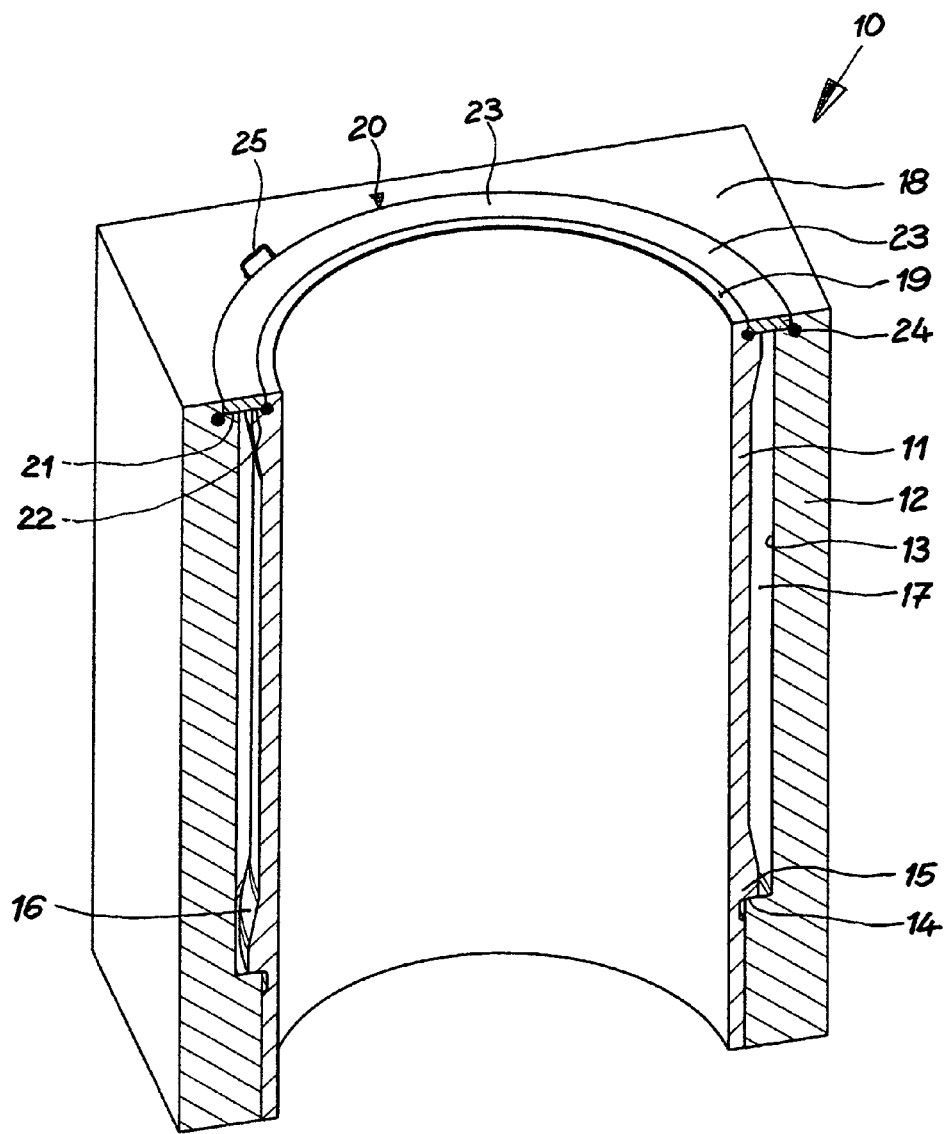
FIG. 1 shows sectional perspective view of a first embodiment of a modular unit according to the invention.

FIG. 1 shows a first exemplary embodiment of a modular unit 10 composed of a cylinder sleeve 11 and a crankcase 12, whereby the crankcase is shown only in part. Crankcase 12 can be produced not only from casting alloys, steel alloys, but also aluminum alloys. The material to be used can be selected as a function of the use and the design requirements.

Cylinder sleeve 11 consists of a steel material or a gray iron alloy, in the exemplary embodiment of St52-3, and is drawn from a pipe, in a seamless manner. A welded pipe can also be used.

Cylinder sleeve 11 is accommodated in a cylinder bore 13 in the crankcase. In the exemplary embodiment, the inner wall of cylinder bore 13 is provided with a circumferential support edge 14, on which cylinder sleeve 11 supports itself with a corresponding support collar 15 formed on its outer mantle surface. Above support collar 15, cylinder sleeve 11 has a bulging contact surface 16, which supports itself on the inner wall of cylinder bore 13, on its outer mantle surface.

Crankcase 12 is provided with a face surface 18, along which the cylinder head or the cylinder head gasket of the internal combustion engine lies in the assembled state, forming a seal. Face surface 18 is therefore oriented toward the later combustion chamber side of the internal combustion engine. Cylinder sleeve 11 has a circumferential face surface 19 that is also oriented toward the combustion chamber side of the internal combustion engine.

Cylinder bore 13 and cylinder sleeve 11 close a circumferential cooling water space 17 that is formed by the inner wall of cylinder bore 13 and the outer mantle surface of cylinder sleeve 11. Crankcase 12 is provided, in known manner, with inflow and outflow channels for cooling water (not shown). Cooling water space 17 is open toward the top, i.e. toward face surfaces 18, 19.

A holder ring 20 serves for closing off cooling water space 17 and for radial guidance of cylinder sleeve 11 in cylinder bore 13. Holder ring 20 can be produced from metallic materials, such as low-alloyed steel materials, C15, GJL 250, GJV, GJS, etc. It has been shown that corrosion-resistant steels can be used to prevent corrosion on the holder ring.

The selection of the material depends on the mechanical and thermal properties that the holder ring is supposed to demonstrate in an individual case, and what materials were selected for crankcase 12 and cylinder sleeve 11. In this manner, the mechanical and thermal properties of the individual components can be coordinated with one another.

In the exemplary embodiment according to FIG. 1, the holder ring is disposed in the region of face surface 18 of crankcase 12 and face surface 19 of cylinder sleeve 11. In this embodiment, face surface 18 of crankcase 12 and face surface 19 of cylinder sleeve 11 are disposed in the same plane, in the assembled state. In a region of face surface 18 of crankcase 12 that lies adjacent to cooling water space 17, a circumferential mortise 21 is worked in. Corresponding to this, a mortise 22 is worked into the region of face surface 19 of cylinder sleeve 11 that lies adjacent to cooling water space 17.

The two corresponding mortises 21, 22 accommodate holder ring 20, in such a manner that holder ring 20 completely covers the cooling water space. Holder ring 20 has a face surface 23 that is also oriented toward the later combustion chamber side of the internal combustion engine in the assembled state. Face surface 23 of holder ring 20 is disposed flush not only to face surface 18 of crankcase 12 but also to face surface 19 of cylinder sleeve 11.

Holder ring 20 is particularly introduced into mortises 21, 22 with a slight excess dimension if the crankcase consists of an aluminum alloy having a high heat expansion coefficient. The excess dimension is balanced out by the expansion of the material during engine operation, and a slight play fit or shift fit occurs between holder ring 20 and mortises 21, 22.

To improve the sealing effect of holder ring 20 with regard to cooling water space 17, seals 24 in the form of O-rings are provided in the exemplary embodiment, in the region of mortises 21, 22.

Face surface 18 of crankcase 12 has a lift-out depression 25 assigned to holder ring 20, in order to simplify removal of holder ring 20. The lift-out depression 25 serves as a grasping means for lifting the holder ring 20 out of the mortises 21, 22.

For assembly of modular unit 10 according to the invention or of the finished engine, first cylinder sleeve 11 is set into cylinder bore 13. Then, in known manner, a piston is inserted into cylinder sleeve 11 and installed. Then holder ring 20 is set into mortises 21, 22.

Figure 2:
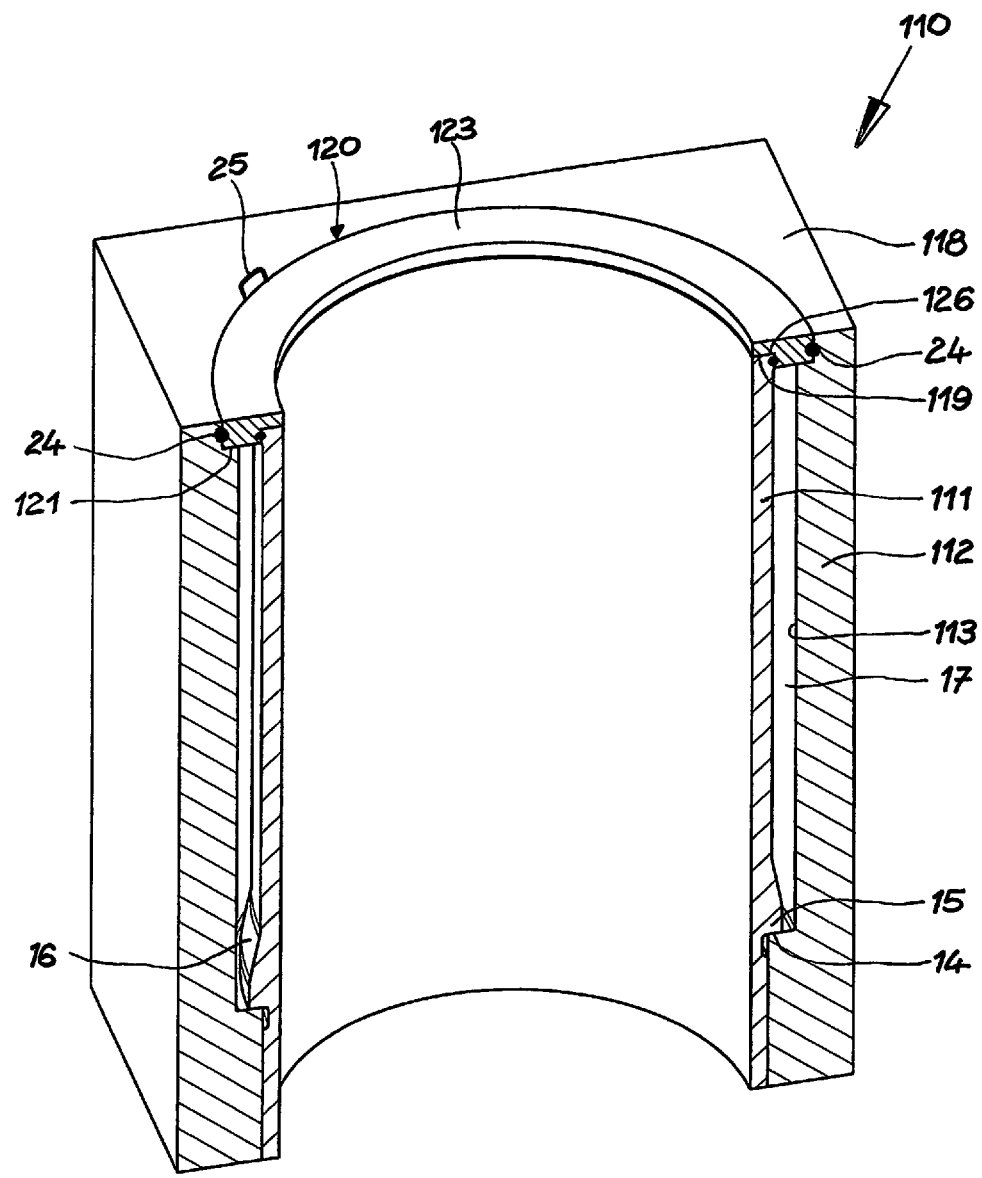
FIG. 2 shows a sectional perspective view of another exemplary embodiment of a modular unit according to the invention.

FIG. 2 shows another exemplary embodiment of a modular unit 110 composed of a cylinder sleeve 111 and a crankcase 112, whereby the crankcase is shown only in part. Modular unit 110 essentially corresponds to modular unit 10 according to FIG. 1, so that the same structural characteristics are provided with the same reference symbols, and reference is made to FIG. 1 in this regard.

The essential difference between the exemplary embodiment according to FIG. 2 and the exemplary embodiment according to FIG. 1 consists in that holder ring 120, which serves for closing off cooling water space 17 and for radial guidance of the cylinder sleeve 111 in cylinder bore 13, completely covers the face surface 119 of cylinder sleeve 111. In this exemplary embodiment, face surface 119 of cylinder sleeve 111 is not disposed in the same plane as face surface 118 of crankcase 112, but rather is set back axially. This has the result that face surface 123 of holder ring 120 is disposed flush with face surface 118 of crankcase 112 in the assembled state.

For this purpose, a circumferential mortise 121 is worked into a region of the face surface 118 of the crankcase 112, adjacent to the cooling water space 17. Mortise 121 lies axially below face surface 119 of cylinder sleeve 111. Corresponding to this, a mortise 126 is worked into the region of holder ring 120 that covers face surface 119 of cylinder sleeve 111. Mortise 121 takes holder ring 120, while holder ring 120, with its mortise 126, supports itself on face surface 119 of cylinder sleeve 111. In this way, reliable radial guidance of cylinder sleeve 111 is achieved.

To improve the sealing effect of holder ring 120 with regard to cooling water space 17, seals 24 in the form of O-rings are provided in the region of mortises 121, 126, in the exemplary embodiment.

Figure 3:
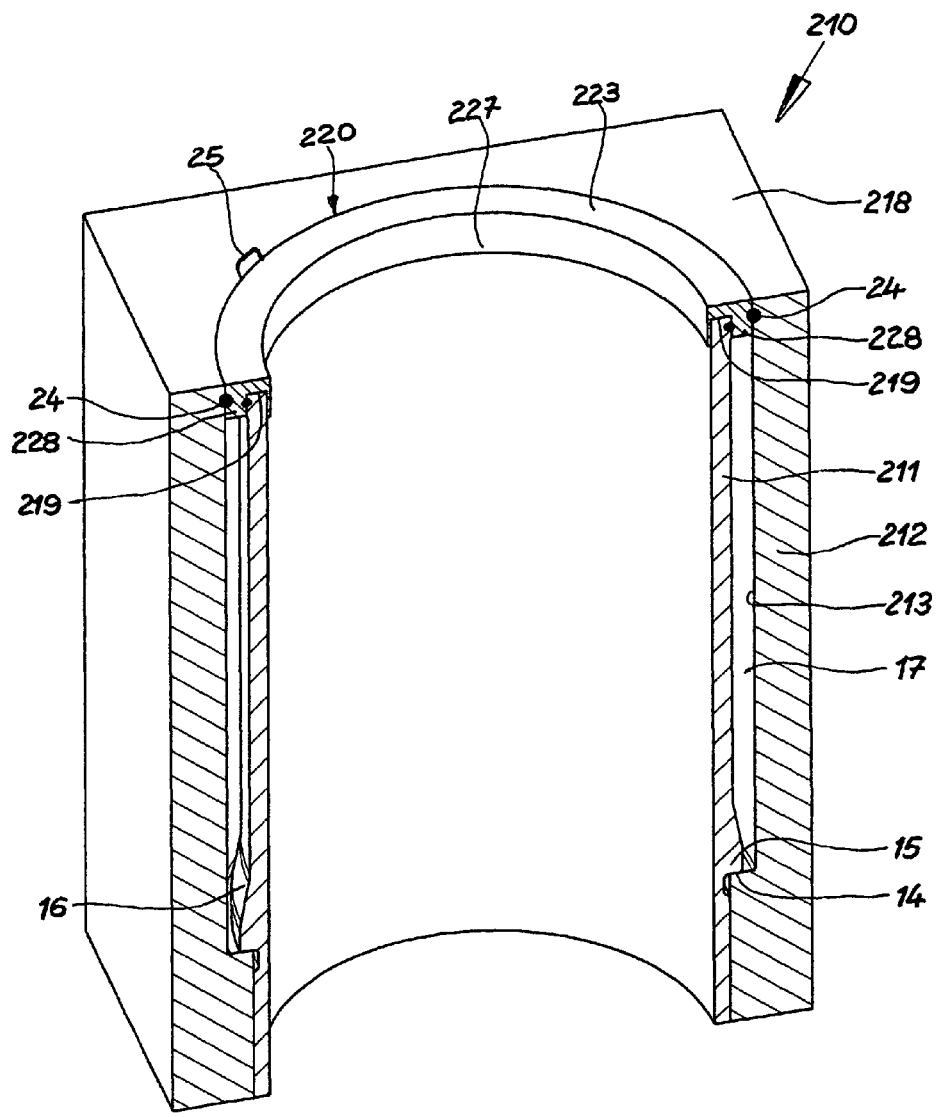
FIG. 3 shows a sectional perspective view of another exemplary embodiment of a modular unit according to the invention.

FIG. 3 shows another exemplary embodiment of a modular unit 210 composed of a cylinder sleeve 211 and a crankcase 212, whereby the crankcase is shown only in part. Modular unit 210 essentially corresponds to modular unit 10 according to FIG. 1, so that the same structural characteristics are provided with the same reference symbols, and reference is made to FIG. 1 in this regard.

The essential difference between the exemplary embodiment according to FIG. 3 and the exemplary embodiment according to FIGS. 1 and 2 consists in that holder ring 220, which serves for closing off cooling water space 17 and for radial guidance of cylinder sleeve 211 in cylinder bore 13, engages over face surface 219 of cylinder sleeve 211 with a stripper ring 227 formed onto holder ring 120 in one piece, in this embodiment. In this embodiment, as well, face surface 219 of cylinder sleeve 211 is not disposed in the same plane as face surface 218 of the crankcase 212, but rather is set back axially. This has the result that face surface 223 of holder ring 220 is disposed flush with face surface 218 of crankcase 212 in the assembled state.

In this embodiment, no mortises are introduced. Instead, holder ring 220 forms a circumferential U-shaped recess with one shank 228 and stripper ring 227 that is formed onto it in one piece, in which recess face surface 219 and the adjacent region of cylinder sleeve 211 are accommodated. In this way, reliable radial guidance of the cylinder sleeve 211 is achieved. Shank 228 of holder ring 220 additionally projects into cooling water space 17. In this way, cooling water space 17 is sealed off. Shank 228 supports itself not only on the outer mantle surface of cylinder sleeve 211 but also on the inner surface of cylinder bore 13. In this way, reliable radial guidance of cylinder sleeve 211 is guaranteed.

Stripper ring 227 serves to strip off carbon deposits, which might form during engine operation, from the piston accommodated in cylinder sleeve 211 in the finished engine. The stripper ring can be configured to have a thin wall, for this purpose.

To improve the sealing effect of holder ring 220 with regard to cooling water space 17, seals 24 in the form of O-rings are provided in the region of shank 228, in the exemplary embodiment.

Accordingly, while only a few embodiments of the present invention have been shown and described, it is obvious that many changes and modifications may be made thereunto without departing from the spirit and scope of the invention.

What is claimed is:

1. A modular unit comprising a cylinder sleeve and a crankcase for an internal combustion engine, wherein the cylinder sleeve and the crankcase each have a face surface, wherein a cooling water space that at least partly surrounds the cylinder sleeve and is open toward the face surfaces is configured between the cylinder sleeve and the crankcase, and further comprising a one-piece removable and replaceable holder ring that completely covers the cooling water space and at least partially covers the face surface of the cylinder sleeve, wherein the face surface of the crankcase has at least one lift-out depression or lift-out groove for the holder ring,
   wherein a face surface of the holder ring is disposed flush with the face surface of the crankcase,
      wherein the crankcase has a mortise in a region of its face surface and wherein the holder ring is accommodated in this mortise, wherein a seal in the form of an O-ring is provided in the region of the mortise, and
      wherein the cylinder sleeve has a mortise in a region of its face surface, such that the holder ring is accommodated in the mortise of the cylinder sleeve and wherein a seal in the form of an O-ring is provided in the region of the mortise of the cylinder sleeve.

2. The modular unit according to claim 1, wherein a face surface of the holder ring is disposed flush with the face surface of the cylinder sleeve and with the face surface of the crankcase.

3. The modular unit according to claim 1, wherein the holder ring consists of a metallic material.

4. The modular unit according to claim 3, wherein the holder ring consists of a cast-iron alloy, a steel material, or a non-ferrous alloy.

5. The modular unit according to claim 1, wherein the holder ring is coated.

6. A modular unit comprising a cylinder sleeve and a crankcase for an internal combustion engine,
   wherein the cylinder sleeve and the crankcase each have a face surface,
   wherein a cooling water space that at least partly surrounds the cylinder sleeve and is open toward the face surface is configured between the cylinder sleeve and the crankcase,
   further comprising a one-piece removable and replaceable holder ring that completely covers the cooling water space and completely covers the face surface of the cylinder sleeve,
   wherein the face surface of the crankcase has at least one lift-out depression or lift-out groove for the holder ring,
   wherein a face surface of the holder ring is disposed flush with the face surface of the crankcase,
   wherein the crankcase has a mortise in a region of its face surface and wherein the holder ring is accommodated in this mortise, wherein a seal in the form of an O-ring is provided in the region of the mortise, and
   wherein the holder ring has a mortise in a region of the face surface that covers the cylinder sleeve, and wherein a seal in the form of an O-ring is provided in the region of the mortise.

7. The modular unit according to claim 6, wherein the holder ring consists of a metallic material.

8. The modular unit according to claim 6, wherein the holder ring consists of a cast-iron alloy, a steel material, or a non-ferrous alloy.

9. The modular unit according to claim 6, wherein the holder ring is coated.

* * * * *